(12) United States Patent
Murakami

(10) Patent No.: US 11,884,224 B2
(45) Date of Patent: Jan. 30, 2024

(54) METHOD FOR PREVENTING REUSE OF TRAVELING BATTERY FOR VEHICLE

(71) Applicant: SUBARU CORPORATION, Tokyo (JP)

(72) Inventor: Tsukasa Murakami, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 238 days.

(21) Appl. No.: 17/498,904

(22) Filed: Oct. 12, 2021

(65) Prior Publication Data
US 2022/0111812 A1   Apr. 14, 2022

(30) Foreign Application Priority Data

Oct. 14, 2020   (JP) ................................ 2020-173222

(51) Int. Cl.
*B60R 21/013* (2006.01)
*B60L 58/10* (2019.01)
*H01M 50/204* (2021.01)

(52) U.S. Cl.
CPC ............ *B60R 21/013* (2013.01); *B60L 58/10* (2019.02); *H01M 50/204* (2021.01); *H01M 2220/20* (2013.01)

(58) Field of Classification Search
CPC .. B60R 21/013; B60L 58/10; B60L 2240/547; B60L 3/0007; B60L 3/0046; B60L 3/04; B60L 58/16; B60L 58/20; B60L 58/21; H01M 50/204; H01M 2220/20
See application file for complete search history.

(56) References Cited

U.S. PATENT DOCUMENTS

| | | | | | |
|---|---|---|---|---|---|
| 3,916,376 | A | * | 10/1975 | Tuttle | B60R 21/0173 340/669 |
| 2013/0307328 | A1 | * | 11/2013 | Maemoto | H01M 50/204 307/10.1 |
| 2014/0070772 | A1 | * | 3/2014 | Andres | H01M 10/425 320/136 |
| 2021/0094622 | A1 | * | 4/2021 | Okamura | B62D 25/2027 |
| 2021/0288604 | A1 | * | 9/2021 | Kondo | B60L 3/0007 |

FOREIGN PATENT DOCUMENTS

| | | | |
|---|---|---|---|
| EP | 3819161 A1 * | 5/2021 | ............ B60L 58/10 |
| JP | H09-284904 A | 10/1997 | |
| JP | 2000-092605 A | 3/2000 | |
| JP | 2010-264830 A | 11/2010 | |

* cited by examiner

*Primary Examiner* — George C Jin
(74) *Attorney, Agent, or Firm* — Smith, Gambrell & Russell, LLP

(57) ABSTRACT

Provided is a method for preventing improper reuse of a traveling battery mounted on a vehicle. The vehicle includes a battery module, an electronic control unit, and an impact detection sensor. The battery module includes battery cells that are stacked together. The electronic control unit is capable of controlling a voltage of each of the battery cells of the battery module, using an auxiliary battery as a drive power supply. The impact detection sensor is configured to detect a magnitude of an impact to be applied to the vehicle. The method for preventing reuse of the traveling battery includes causing the electronic control unit to perform low-voltage-control exclusively on one of the battery cells that is selected in advance in a case where the magnitude of the impact detected by the impact detection sensor is a predetermined value or greater.

8 Claims, 3 Drawing Sheets

METHOD FOR PREVENTING REUSE OF TRAVELING BATTERY FOR VEHICLE

CROSS-REFERENCE TO RELATED APPLICATIONS

The present application claims priority from Japanese Patent Application No. 2020-173222 filed on Oct. 14, 2020, the entire contents of which are hereby incorporated by reference.

BACKGROUND

The disclosure relates to a method for preventing reuse of a traveling battery, and particularly relates to a method for preventing reuse of a traveling battery for a vehicle having caused an accident.

An electric vehicle uses energy from a traveling battery mounted thereon as a drive source for traveling. In such an electric vehicle, in a case where the electric vehicle has received an impact to the extent that the outer shape thereof is greatly deformed (such as a case where a collision accident has occurred), control to lower the voltage of the traveling battery to a defined voltage or less at the instant when the vehicle detects the impact is performed for safety reasons to prevent an electric shock or a fire caused by the traveling battery.

Japanese Unexamined Patent Application Publication (JP-A) No. 2010-264830 discloses a configuration in which when a vehicle receives an impact from the outside, a plurality of battery modules coupled in series are branched into three groups by an operation of a shutting off device, and a voltage of the battery modules becomes a set voltage or lower.

Japanese Unexamined Patent Application Publication (JP-A) No. 2000-92605 discloses detecting, when an automobile collides, the collision by a collision detection device, transmitting the collision state to a switch control device, and lowering the voltage generated by a power supply at the normal operation, by operating a switch by the switch control device.

Japanese Unexamined Patent Application Publication (JP-A) No. H9-284904 discloses a configuration in which when a collision of a vehicle is detected, a safety device is activated to short-circuit between adjacent batteries in the battery.

In such a situation, even in the vehicle having caused the accident, the traveling battery may not be significantly damaged, and the traveling battery itself may be in a reusable state. In such a case, a third party might remove the traveling battery and divert the traveling battery to other purposes without permission. Such a diversion is not desirable from the viewpoint of safety management.

SUMMARY

An aspect of the disclosure provides a method for preventing improper reuse of a traveling battery mounted on a vehicle. The vehicle includes a battery module, an electronic control unit, and an impact detection sensor. The battery module includes battery cells that are stacked together. The electronic control unit capable of controlling a voltage of each of the battery cells of the battery module, using an auxiliary battery as a drive power supply. The impact detection sensor is configured to detect a magnitude of an impact to be applied to the vehicle. The method for preventing reuse of a traveling battery includes causing the electronic control unit to perform low-voltage-control exclusively on one of the battery cells that is selected in advance in a case where the magnitude of the impact detected by the impact detection sensor is a predetermined value or greater.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Any of JP-A No. 2010-264830, JP-A No. 2000-92605, and JP-A No. H9-284904 disclose the techniques in which when a vehicle causes a collision accident, the voltage of the traveling batteries (battery module) are lowered with safety, but do not disclose any method of preventing the reuse thereafter. Accordingly, there is a risk that the traveling batteries (battery module) are removed from the vehicle having caused the accident, and are reused improperly.

It is desirable to provide a method for preventing reuse of a traveling battery capable of preventing, even when a traveling battery is removed from the vehicle having caused the accident, the improper reuse possibility by a third party.

Figure 1:
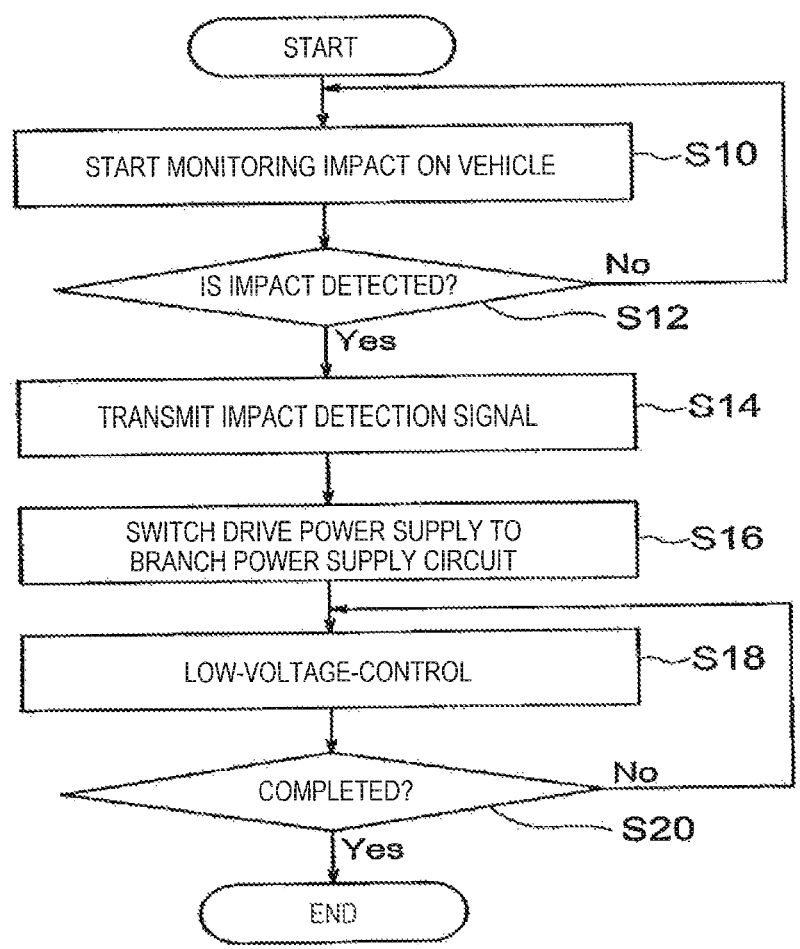
FIG. 1 is a flowchart according to an embodiment of a method for preventing reuse of a traveling battery according to an embodiment of the disclosure.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. FIG. 1 is an execution flowchart of a method for preventing reuse of a traveling battery according to the embodiment of the disclosure. When a vehicle with a battery module mounted thereon starts traveling, an impact detection sensor starts monitoring whether the vehicle has received an impact (step S10). If the impact detection sensor detects the impact having a predetermined value or more (step S12: in a case of Yes), the impact detection sensor transmits an electric signal indicating the detection of the impact to an electronic control unit (ECU) (step S14).

The electronic control unit (ECU), which normally obtains an operation voltage from a 12 V lead battery (auxiliary battery) different from a traveling battery module, assumes that the lead battery becomes unusable when the vehicle impact detection sensor has detected an impact having a predetermined value or more, switches a drive power supply to (is coupled to) a branch power supply circuit, and obtains a drive voltage from the branch power supply circuit (step S16). The branch power supply circuit will be described in detail later with reference to a connection diagram of a battery module.

Next, the electronic control unit performs low-voltage-control for a battery cell determined in advance among a plurality of battery cells that configure the battery module (step S18). The low-voltage-control for the battery cell, which will be described in detail later with reference to the connection diagram of the battery module, causes the electric power of the battery cell to exhaust and to lower the voltage to a defined voltage or lower. The low-voltage-control for the battery cell may be performed simultaneously or successively to a plurality of battery cells to which the control is determined to be executed.

If the low-voltage-control for the determined battery cell is completed (step S20: in a case of Yes), the flow ends.

Figure 2:
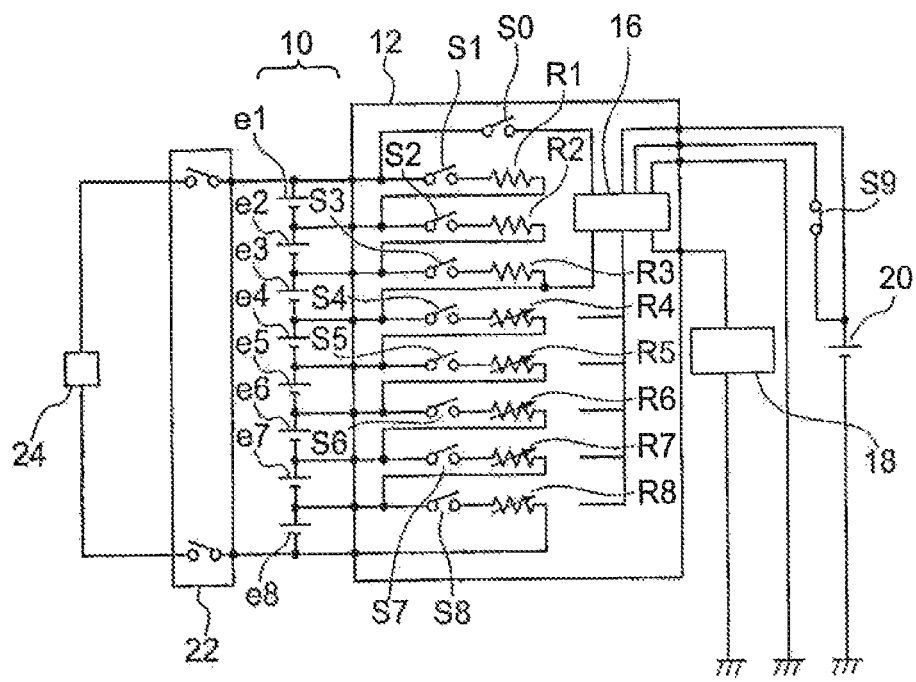
FIG. 2 is a connection diagram of a battery module of the traveling battery and an electronic control unit.

FIG. 2 is a connection diagram of a battery module and an electronic control unit. In the present embodiment, eight battery cells e1 to e8 are coupled in series to implement a battery module 10. A resistor is coupled to each of the battery cells via a switch to implement a voltage control circuit. For example, a resistor R1 is coupled to the battery cell e1 via a switch S1 to implement a voltage control circuit. Similarly, a resistor R8 is coupled to the battery cell e8 via a switch S8 to implement a voltage control circuit. In the present embodiment, resistors R4 to R8 are variable resistors, and R1 to R3 are fixed resistors. An electronic control unit 16 controls on and off of these switches S1 to S8.

The switch S0 is, as will be described later, a switch for switching a drive power supply of the electronic control unit 16 from a normal lead battery (auxiliary battery) 20 to a branch power supply circuit. The electronic control unit 16 controls on and off of the switch S0 as well. The switches S0 and S1 to S8, the resistors R1 to R8, and the electronic control unit 16 implement an in-line unit 12. Moreover, an inverter 24 and a main relay 22 for driving a travel motor (not illustrated) is coupled to the battery module 10 at a left side thereof. An impact detection sensor 18 and the lead battery 20, that is a normal power supply, are coupled to the in-line unit 12 at a right side thereof.

An operation voltage is normally supplied to the electronic control unit 16 from the lead battery 20 via the switch S9, as described above. However, when the impact detection sensor 18 detects an impact of a defined value or greater applied to the vehicle, as will be described later, the drive power source is switched to the branch power supply circuit, and a drive voltage is supplied to the electronic control unit 16 from the battery cell. The electronic control unit 16 controls on and off of the switch S9 as well. Moreover, the impact detection sensor 18 is coupled to the electronic control unit 16 all the time, and transmits, when the impact detection sensor 18 has detected an impact having a defined value or more as indicated below, an electric signal indicating the detection of the impact to the electronic control unit 16.

Figure 3:
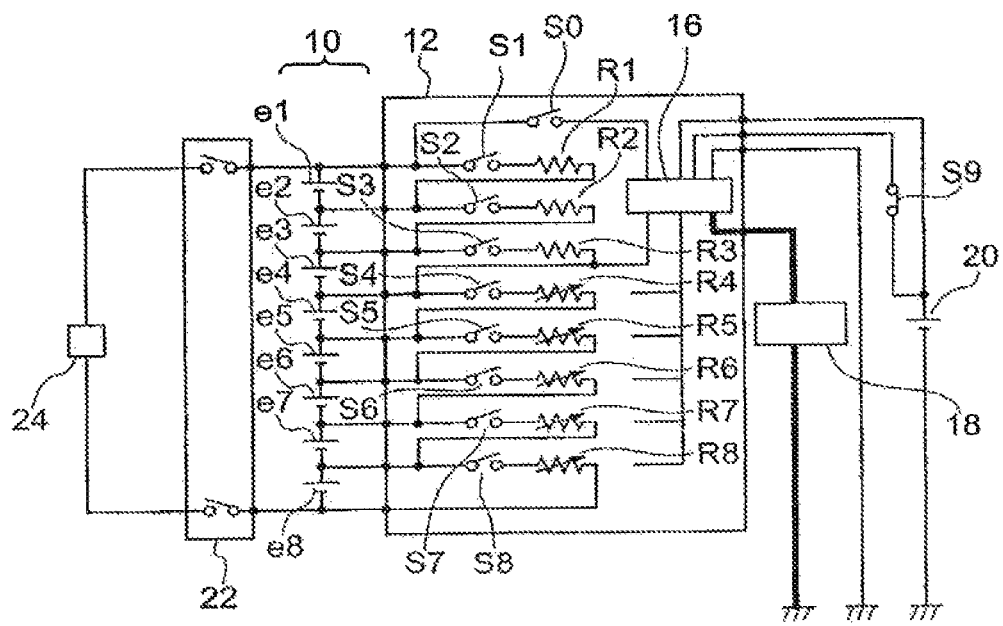
FIG. 3 is a diagram for explanation in a case where an impact detection sensor has detected an impact having a defined value or more in the connection diagram of FIG. 2.

FIG. 3 is a diagram for explanation in a case where the impact detection sensor has detected an impact having a defined value or more in the connection diagram of FIG. 2. In other words, when the impact detection sensor 18 has detected an impact (impact having a defined value or more) with a large deformation of an outer shape of the vehicle, the impact detection sensor 18 sends a detection signal thereof to the electronic control unit 16. FIG. 3 illustrates a state where the detection signal is sent to the electronic control unit 16.

Figure 4:
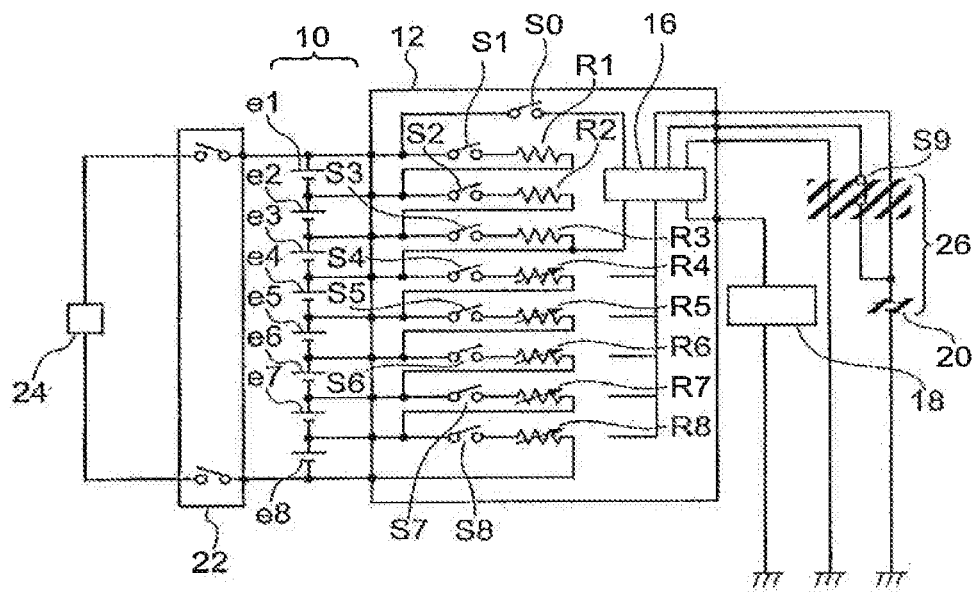
FIG. 4 is a diagram for explanation in a case where the impact detection sensor has detected an impact having a defined value or more in the connection diagram of FIG. 2.

FIG. 4 is a diagram for explanation in a case where the impact detection sensor has detected an impact having a defined value or more continuous to FIG. 3. When the impact detection sensor 18 has detected an impact having a defined value or more, a location illustrated by a hatched line is generally included in a damaged portion 26 to disable use of the normal lead battery 20.

Figure 5:
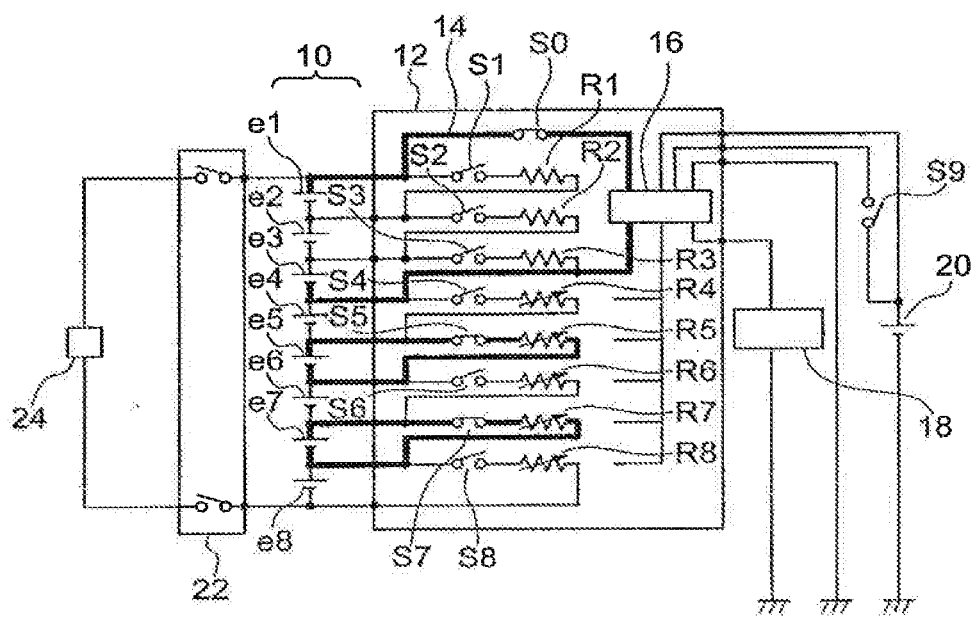
FIG. 5 is a diagram for explanation in which battery cells are subject to low-voltage-control by the method for preventing reuse of a traveling battery according to the embodiment.

FIG. 5 is a diagram for explanation in which battery cells are subjected to low-voltage-control by the method for preventing reuse of a traveling battery according to the embodiment of the disclosure. In the present embodiment, the two battery cells of e5 and e7 are battery cells to be subjected to the low-voltage-control.

Firstly, a branch power supply circuit 14 will be described. When a detection signal from the impact detection sensor 18 is input to the electronic control unit 16, the electronic control unit 16 opens the switch S9 and closes the switch S0 in the in-line unit 12. Accordingly, a drive power supply of the electronic control unit 16 is supplied by the battery cells e1, e2, and e3. In other words, the branch power supply circuit 14 is configured with the battery cells e1, e2, and e3 and the switch S0 in the present embodiment, and the switch S0 is closed to supply a drive voltage to the electronic control unit 16. The branch power supply circuit 14 is illustrated by a thick line.

Herein, battery cells that implement the branch power supply circuit 14 are limited to the battery cells that are not subjected to the low-voltage-control, and are the battery cells e1 to e3 in the present embodiment. It is to be noted that the switch S9 is automatically opened when the detection signal from the impact detection sensor 18 is input to the electronic control unit 16, which is independent of whether the lead battery 20 holds the defined voltage when the vehicle has received the impact. In other words, even when the vehicle has caused an accident to damage the auxiliary battery and the like and the power supply of the electronic control unit 16 is lost, a power supply is obtained from the battery cell of the battery module to immediately perform the low-voltage-control for the battery module.

The low-voltage-control is subsequently conducted. In the present embodiment, the battery cells e5 and e7 are subjected to the low-voltage-control. The electronic control unit 16 closes the switches S5 and S7 to respectively couple the battery cells e5 and e7 to the resistors R5 and R7, and the electric power of each battery cell is exhausted. In other words, the electric power capacitance of the battery cell is exhausted by the resistor to obtain the defined voltage or lower.

Herein, the battery cells e5 and e7 to be subjected to the low-voltage-control is battery cells that is not in a poor state of health, so that the execution of the low-voltage-control does not affect the lifetime of each battery cell.

Moreover, the abovementioned electronic control unit 16 stores information that battery cells to be subjected to the low-voltage-control are the battery cells e5 and e7, at the shipping inspection of the vehicle. Accordingly, the specified battery cells (e5, e7) to be subjected to the low-voltagecontrol when an accident has occurred are assigned in advance to the battery module 10, so that low-voltage-controlled battery cells can be immediately identified at the time of reuse, and the battery cells are charged to make the battery module 10 in a reusable state.

Moreover, in a case where a low-voltage-controlled battery module is improperly removed, it is possible to determine that the battery module is improperly removed by checking where there is one or more low-voltage-controlled battery cells, in the course of distribution of the low-voltage-controlled battery module.

In addition, it is also possible to allow the low-voltage-control from an outside of the vehicle by mounting a communication function to the vehicle. Accordingly, in a case where the vehicle has been stolen, for example, an owner remotely can execute the low-voltage-control by him/herself using a mobile telephone, and prevent the stolen vehicle from being moved.

With the method for preventing reuse of a traveling battery according to the present embodiment, in a case where a battery module of an accident vehicle is reused, the low-voltage-controlled specified battery cell is to be identified. In other words, if the low-voltage-controlled specified battery cell is not identified, it is difficult to put the battery module back to a reusable state. Accordingly, even when a battery module is removed by a third party from a vehicle having caused an accident, only a person who can identify the low-voltage-controlled battery cell in advance, in other words, a person who has set the electronic control unit and is allowed to use the battery module appropriately can reuse the battery module. This can prevent the traveling battery from being easily and improperly reused.

It is to be noted that the disclosure is not limited to the abovementioned embodiment, but various modifications are possible within a range not departing from the gist of the disclosure. For example, the case where the two battery cells are subjected to the low-voltage-control has been indicated as an example, the number is not limited to two. Moreover, the case where the number of the battery cells of the battery module is eight has been indicated as an example, but the number is not limited to eight.

Even when a third party improperly removes a battery module from a vehicle having caused an accident and intends to reuse it, the third party is unable to obtain an accurate operation due to the presence of the low-voltage-controlled battery cell and does not know the reason, and thus is unable to easily make the battery module be a reusable state. Accordingly, improper reuse of the battery module is prevented.

The electronic control unit 16 illustrated in FIG. 2 is implementable by circuitry including at least one semiconductor integrated circuit such as at least one processor (e.g., a central processing unit (CPU)), at least one application specific integrated circuit (ASI), and/or at least one field programmable gate array (FPGA). At least one processor is configurable, by reading instructions from at least one machine readable non-transitory tangible medium, to perform all or a part of functions of the electronic control unit 16 illustrated in FIG. 2. Such a medium may take many forms, including, but not limited to, any type of magnetic medium such as a hard disk, any type optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the electronic control unit 16 illustrated in FIG. 2.

The invention claimed is:

1. A method for preventing improper reuse of a traveling battery mounted on a vehicle, wherein the vehicle comprises
a battery module comprising battery cells that are stacked together,
an electronic control unit capable of controlling a voltage of each of the battery cells of the battery module, using an auxiliary battery as a drive power supply, and
an impact detection sensor configured to detect a magnitude of an impact to be applied to the vehicle,
the method for preventing reuse of a traveling battery comprising:
causing the electronic control unit to perform low-voltage-control exclusively on one of the battery cells that is selected in advance in a case where the magnitude of the impact detected by the impact detection sensor is a predetermined value or greater.

2. The method for preventing reuse of a traveling battery according to claim 1, wherein in the case where the magnitude of the impact detected by the impact detection sensor is the predetermined value or greater, the electronic control unit switches the drive power supply thereof from the auxiliary battery to a battery cell of the battery module other than the one of the battery cells that is selected in advance.

3. The method for preventing reuse of a traveling battery according to claim 1, wherein the electronic control unit stores information on a battery cell on which the low-voltage-control is to be performed, at a shipping inspection of the vehicle.

4. The method for preventing reuse of a traveling battery according to claim 2, wherein the electronic control unit stores information on a battery cell on which the low-voltage-control is to be performed, at a shipping inspection of the vehicle.

5. The method for preventing reuse of a traveling battery according to claim 1, wherein one of the battery cells on which the low-voltage-control is to be performed is a battery cell that is not in a poor state of health.

6. The method for preventing reuse of a traveling battery according to claim 2, wherein one of the battery cells on which the low-voltage-control is to be performed is a battery cell that is not in a poor state of health.

7. The method for preventing reuse of a traveling battery according to claim 3, wherein one of the battery cells on which the low-voltage-control is to be performed is a battery cell that is not in a poor state of health.

8. The method for preventing reuse of a traveling battery according to claim 4, wherein one of the battery cells on which the low-voltage-control is to be performed is a battery cell that is not in a poor state of health.

* * * * *